Aug. 3, 1948.    F. R. GOOD    2,446,276
AUTOMOBILE BRAKE SIGNAL
Filed June 7, 1947    2 Sheets-Sheet 1
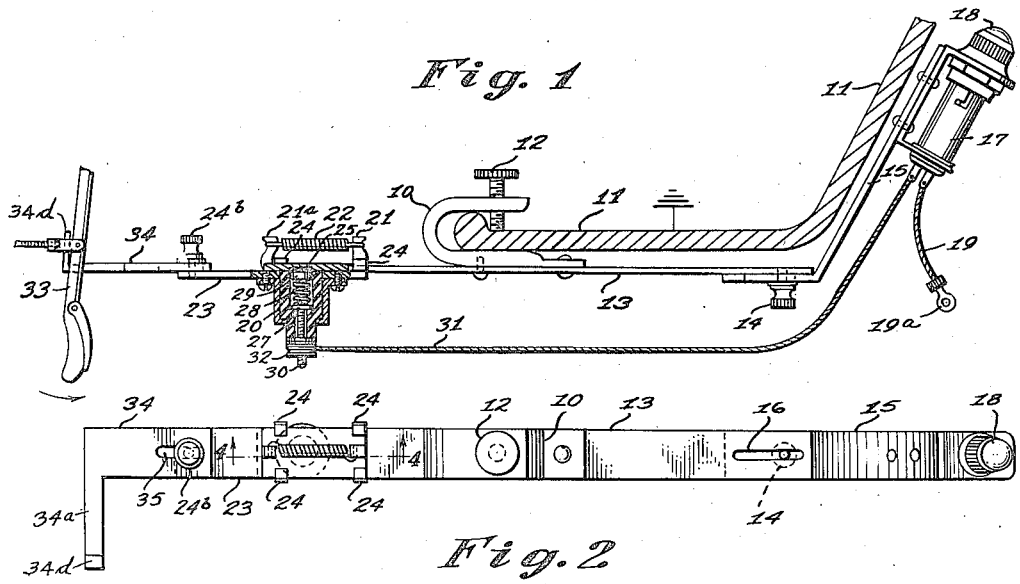
Fig. 1
Fig. 2
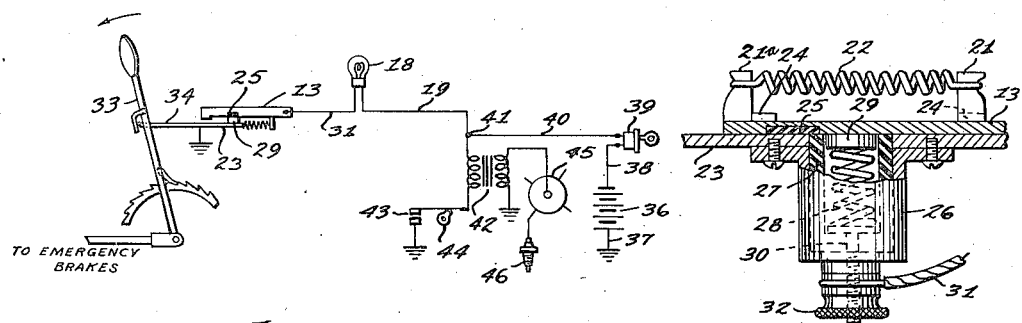
TO EMERGENCY BRAKES
Fig. 3    Fig. 4
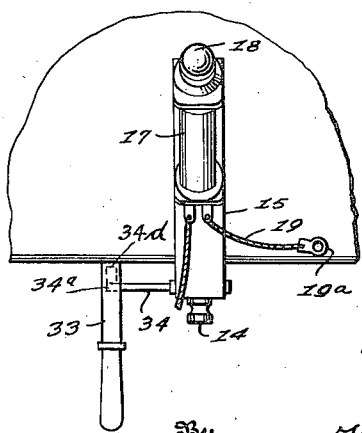
Fig. 5
Inventor
FRANCIS R. GOOD
By Thomas Appleby
Attorney Aug. 3, 1948.    F. R. GOOD    2,446,276
AUTOMOBILE BRAKE SIGNAL
Filed June 7, 1947    2 Sheets-Sheet 2
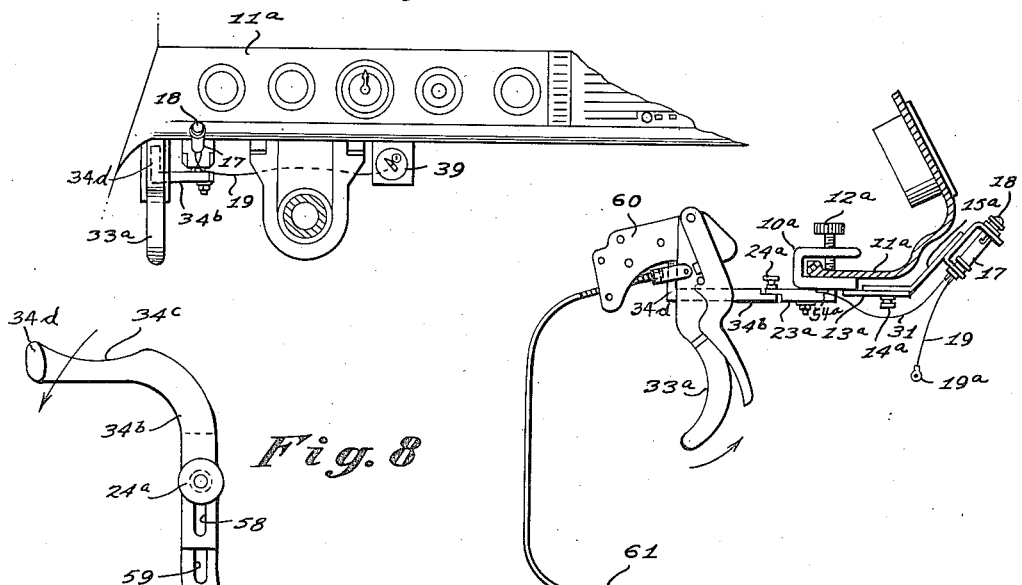
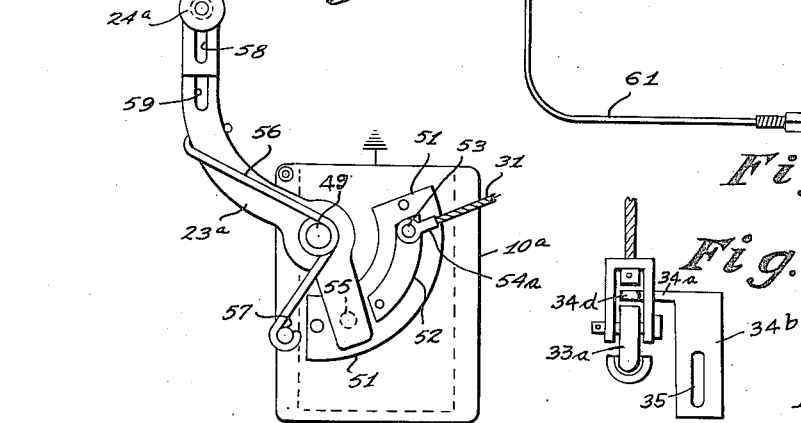
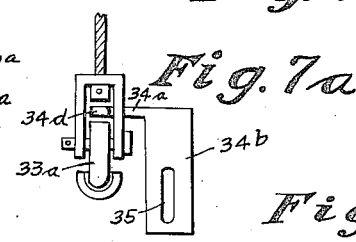
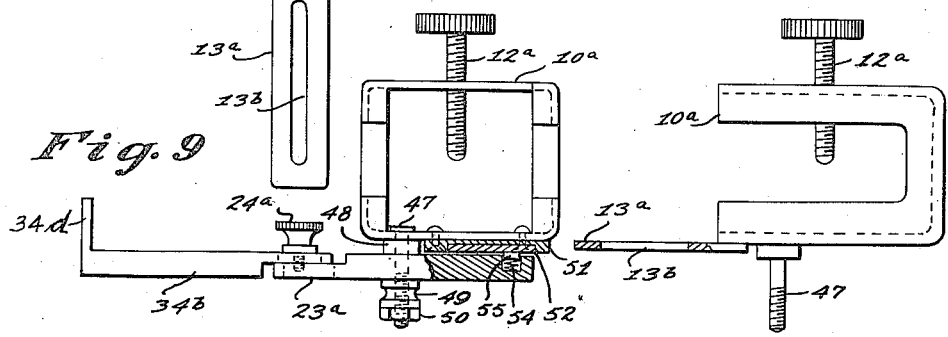
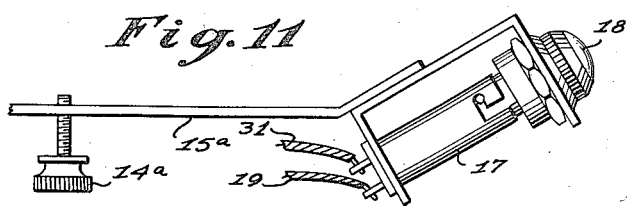
INVENTOR.
FRANCIS R. GOOD
BY Thomas Appleby
ATTORNEY Patented Aug. 3, 1948

2,446,276

UNITED STATES PATENT OFFICE 2,446,276

AUTOMOBILE BRAKE SIGNAL

Francis R. Good, Long Beach, Calif.

Application June 7, 1947, Serial No. 753,209

1 Claim. (Cl. 177—311)

This invention relates to signaling systems and more particularly to systems for use in connection with automobiles for automatically indicating to the driver the unintended application of the emergency or hand brake at a time when said brake should be fully released, such as just prior to shifting the clutch to its engaged position.

An object of this invention is to provide a simple, easily installed, inexpensive and positively acting unitary switch mechanism which will automatically function upon application of the emergency brake and give a suitable indication to warn the driver that the brakes are applied when he turns on the ignition current preparatory to starting the vehicle and such warning signal will continue until the emergency brake has been released; thus avoiding undue wear of brake lining, loss of power, strain upon the motor and inefficient use of fuel, all of which occur when the vehicle is operated without releasing the hand or emergency brake.

Another object of this invention is to provide a unitary device for signaling the status of the emergency brake, that may be readily and quickly installed upon the dash panel of the automobile without recourse to drilling or otherwise providing holes or other means upon the dash panel for its attachment.

A further object of this invention is to provide a signaling device and system for operation which will not in any way interfere with the normal use of the controlling mechanism of the vehicle.

The simple feature of installation, requiring no drilling or other manipulation of the dash panel upon which this device may be installed, is considered to be of utmost importance in connection with its general application by car owners the majority of whom have not the required tools for drilling or otherwise manipulating metal for installing devices that require permanent bolting or similar attachment. In fact the general adoption and use of this device would be considerably mitigated if the vehicle owner found it necessary to employ a mechanic, resort to a drilling operation himself, or to have to take his automobile to a shop for installation of the signal device, therefore the portability of this device whereby it may be readily attached by anyone without recourse to the use of drills, punches, or similar tools, is an important object of the invention.

Further objects of invention reside in the construction, arrangement, adjustability and operation of the various parts including their association in the electrical system.

These and other objects and features of invention will appear more fully from the accompanying description, the appended claim, and the drawings in which;

Figure 1 shows a side elevational view of the complete device as attached to the underside of an automobile dash panel and in contact with the handle of the emergency or hand brake, Figure 2 is a plan view of Figure 1, Figure 3 shows the electrical system of the automobile to which the device may be connected, Figure 4 is a sectional elevation taken along line 4—4 of Figure 2, Figure 5 is a view of the signal light and bracket as seen by the vehicle operator, Figure 6 is a view of the dash panel and emergency brake with the signal device as seen by the vehicle operator, Figure 7 is a side elevation of a modification of the signal device, Figure 7a is a plan view of the brake lever and lever contact plate of Figure 7.

Figure 8 is a bottom view of the modified device of Figure 7,

Figure 9 is a front elevation, partly in section, of the contact lever or bar and clamp of the modified device, Figure 10 shows a side elevation of the clamp and signal bracket extension, and Figure 11 is a side elevation of the signal light and supporting bracket.

In Figure 1 a clamp 10 suitably shaped to embrace the lower inside edge of an automobile dash panel 11 is provided with a thumb screw 12 easily accessible and readily operable without recourse to tools for drilling or otherwise manipulating or defacing the dash panel for attachment thereto.

Secured to the clamp 10, in any suitable manner, is a bar 13 drilled and tapped at one end to support a securing thumb-screw 14 for adjustably securing a signal light arm 15. The arm 15 is provided with a longitudinal slot 16 cooperating with the thumb-screw 14 for suitably positioning the signal lamp 18 adjacent the front of the dash panel 11 where it may be readily seen by the operator of the vehicle. The signal light may consist as shown of a casing 17 containing a suitable incandescent bulb and a lens or glass cover 18 of any suitable color such as, for example, red. The bulb is preferably of the two contact type and a lead 19 is provided connected at one end to one of the bulb socket terminals and provided at its other end with a suitable lug 19a for connection to the primary terminal of the vehicle's ignition coil as shown in Figure 3, or to the proper terminal of the ignition switch, so that a signal will be shown only while the ignition circuit is closed at the ignition switch.

At the extreme opposite end of bar 13 is secured a spring hook 21a cooperating with a second spring hook or post 21 between which a tension spring 22 is supported. Spring post 21 is secured to and moves with a slide bar 23 supported by means of overturned edges or clips 24 in sliding engagement with the bar 13.

A recess is provided near the spring post end of bar 13 and filled with, or containing a washer of, insulating material 25 (Figures 1, 2 and 4). A housing or casing 26 is secured to the underside of the bar 23 and arranged to contain a shell of insulating material 27 forming a central chamber in which are positioned compression spring 28, electrical contact 29, and screw 30. A lead 31 from the signal lamp 18 is attached to screw 30 by means of thumb-screw 32 and, as shown in Figure 1 with the emergency or hand brake 33 in unapplied position, the bracket 34 having an elongated slot 35 is secured to bar 23 by means of a thumb screw 24b and its upturned end 34d inserted in the brake cable U clamp between the brake lever 33 and the end of the cable (Figure 7a), thus contact 29 (Figure 1) is positioned, with compression spring 28, against the insulating washer 25 so that the circuit to the signal lamp 18 is broken at this point until the hand brake lever 33 is moved in the direction indicated by the arrow to apply the brakes at which time bar 23 will slide along bar 13, extend tension spring 22 and permit contact 29 to slide off the insulating washer 25 and onto the bar 13 closing the signal circuit through the dash grounded clamp 10 and screw 12. The sliding action of electrical contact 29 on bar 13 serves to keep the contact surfaces clean thus assuring a good electrical connection.

Inasmuch as insulating washer 25 need only have a diameter slightly greater than that of contact 29 it will be readily understood that the slightest motion of the brake lever 33 will cause the signal circuit to be closed and the contacts and associated parts, when the hand brake 33 is applied, may assume the maximum "on" signal position shown in Figure 4.

The perpendicular extension 34a (Figure 2) on the end of bracket 34 is provided at its end with an upturned portion 34d suitably designed to accommodate various types of brake levers and to permit its insertion in the U fitting between the brake lever 33 (Figure 7a) and the block or head on the end of the brake cable.

It will be seen that upon full release of the hand brake the tension spring 22 will return the moving switch parts to normal open circuit position and the signal light will be extinguished.

In Figure 3 a wiring system as used on an automobile is shown where the storage battery 36 has one terminal 37 grounded to the frame of the automobile and the other terminal 38 connected to one contact of the ignition lock switch 39, the other contact of the ignition switch is connected via lead 40 to one terminal 41 of the spark coil primary. It is to this spark coil terminal 41, or to the ignition switch terminal to which lead 40 is connected, that the lead 19 from signal lamp 18 may also be connected. The signal lamp circuit being otherwise completed through the frame of the automobile. The balance of the system shown in Figure 3 is conventional and includes the spark coil 42, timer contacts 43, timer cam 44, distributor 45 and spark plug 46.

It will be readily seen that when the device is clamped to the underside of the dash panel 11 by means of thumb-screw 12, arm 15 supporting the signal light 18 may then be adjusted and secured in suitable position by means of thumb-screw 14. Bracket 34 may then be set by means of thumb-nut 24 to proper position with respect to the hand brake 33 that contact 29 will be positioned on the insulating member 25 when the hand brake is released and therefore the slightest "on" position of the hand brake will cause the contact 29 to be slid off the insulating washer 25 and the signal lamp 18 to be illuminated. Current for operating the signal lamp may be obtained by connecting the lug 19a either to the primary terminal of the spark coil as shown in Figure 3, or to the proper terminal of the ignition lock switch, so that the signal lamp 18 will only operate if the ignition switch 39 is in the "on" position preparatory to starting. The balance of the circuit is completed through the clamp 10 to the grounded dash panel 11 back to the grounded terminal 37 of the storage battery. Thus, it will be readily understood that no tools are necessary in making the installation as thumb screws have been provided where necessary.

In Figure 7 is shown a modification of the device attached to dash panel 11a by means of clamp 10a and thumb screw 12a. In this modification a lever or bar 23a is pivotally mounted for rotation on clamp 10a by means of pivot pin 47 (Figure 8), spacer 48 and lock nuts 49 and 50. A plate 51 of insulating material attached to the bottom of clamp bracket 10a is provided with an arcuate slot in which is positioned a flush contact plate 52 extending only part way longitudinally across the insulating plate 51. A screw 53 is provided at one end of contact plate 52 for securing the lug 54a of lead 31 from the signal lamp 18. Suitably positioned in a depression in one end of pivot lever 23a is a compression spring 54 which forces a contact 55 against the bottom of insulating plate 51 and, when the lever 23a is moved to suitable position, causes the contact 55 to slidably ride on the contact plate 52, thus closing the electrical circuit. A spring 56 coiled around pivot nut 49 and having one of its ends embracing the lever 23a and its opposite end secured to pin 57 in clamp bracket 10a serves to retain the lever 23a in "off" contact position until forced in the opposite direction by the brake lever 33a to the "on" position as indicated by the arrows in Figures 7 and 8. An adjustable extension arm 34b, provided with an elongated slot 58 cooperating with a similar slot 59 in lever 23a, is thus arranged to be secured by means of thumb nut 24a in suitable position so that the brake lever or handle 33a contacts its arcuate surface 34c when applied and thus causes the contact 55 to be slid across the insulating plate 51 and onto the contact plate 52 to close the circuit and actuate the signal 18. An extension arm 13a (Figures 8, 10 and 11) containing a longitudinal slot 13b permits suitable support of the signal bracket 15a by means of thumb nut 14a.

Application of the emergency or hand brakes is accomplished by moving the handle 33a (Figure 7) in the direction indicated by the arrow. The handle 33a is pivotally mounted in bracket 60 and connects with the brakes by means of cable 61.

The device herein described may be manufactured as an accessory unit to be temporarily installed on the dash panel of an otherwise assembled vehicle and readily removed and transferred, when desired, to another vehicle without It is to be understood that various modifications and changes may be made in this invention without departing from the spirit and scope thereof, as set forth in the appended claim.

What is claimed is:

An emergency brake signal unit for an automobile, comprising a bracket having a pressure clamp and a thumb screw intermediate its ends for securing said bracket substantially parallel with and to the underside of the dash panel of the vehicle, said bracket provided at one end with a moveable bar, a wiping electrical contact adapted to be actuated by said bar and normally at rest on an insulating member, an extension on one end of said bar adapted to contact the emergency brake handle of the vehicle and to cause said electrical contact to actuate an electrical circuit when the emergency brake is operated, and an arm on the other end of said bracket extending upwardly substantially parallel with the front face of the dash panel and provided with a signal lamp operable upon actuation of said electrical circuit.

FRANCIS R. GOOD.

REFERENCES CITED

The following references are of record in the file of this patent:

UNITED STATES PATENTS

| Number | Name | Date |
| --- | --- | --- |
| 1,859,515 | Kageyama | May 24, 1932 |
| 2,031,202 | Bier | Feb. 18, 1936 |
| 2,234,607 | Riedmaier | Mar. 11, 1941 |
| 2,255,381 | Ellery | Sept. 9, 1941 |
| 2,305,983 | Muth | Dec. 22, 1942 |
| 2,343,394 | Blomberg | Mar. 7, 1944 |